(12) United States Patent
Xu et al.

(10) Patent No.: US 9,996,461 B1
(45) Date of Patent: Jun. 12, 2018

(54) DYNAMIC DIFFERENTIAL COMPRESSION FOR STORAGE DEVICE LOOK-UP TABLE

(71) Applicant: Marvell International Ltd., Hamilton (BM)

(72) Inventors: Wei Xu, Milpitas, CA (US); Ka-Ming Keung, San Jose, CA (US); Fei Sun, Irvine, CA (US); Jinjin He, Santa Clara, CA (US); ChengKuo Huang, Sunnyvale, CA (US); Tony Yoon, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 314 days.

(21) Appl. No.: 14/831,063

(22) Filed: Aug. 20, 2015

Related U.S. Application Data

(60) Provisional application No. 62/054,699, filed on Sep. 24, 2014.

(51) Int. Cl.
*G06F 12/00* (2006.01)
*G06F 12/02* (2006.01)
*G06F 3/06* (2006.01)

(52) U.S. Cl.
CPC ........ *G06F 12/0292* (2013.01); *G06F 3/0608* (2013.01); *G06F 3/0638* (2013.01); *G06F 3/0673* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 9,569,348 | B1 * | 2/2017 | Deming | ................... G06F 12/08 |
| 2011/0072235 | A1 * | 3/2011 | Deming | .............. G06F 12/1027 711/207 |
| 2013/0246689 | A1 * | 9/2013 | Matsudaira | ......... G06F 12/0246 711/103 |
| 2015/0143025 | A1 * | 5/2015 | Gorobets | ............ G11C 11/5628 711/103 |
| 2015/0379737 | A1 * | 12/2015 | Nilsson | ..................... G06T 1/60 345/502 |

\* cited by examiner

*Primary Examiner* — Prasith Thammavong
*Assistant Examiner* — Jason W Blust

(57) ABSTRACT

A method for storing data on a storage device includes receiving data to be stored and a logical address for storing the data. A physical address is determined and the data to be stored is stored at the determined physical address. A table that associates logical addresses with physical addresses is examined to determine a difference relationship between the determined physical address and a corresponding physical address for one of other logical addresses. Information representing the determined physical address is stored in the table, in association with the received logical address, as a function of the determined difference relationship. A data storage device includes controller circuitry and memory for storing a lookup table that associates logical addresses with physical addresses. The controller circuitry operates in accordance with the method.

8 Claims, 7 Drawing Sheets

DYNAMIC DIFFERENTIAL COMPRESSION FOR STORAGE DEVICE LOOK-UP TABLE

CROSS REFERENCE TO RELATED APPLICATION

This claims the benefit of commonly-assigned U.S. Provisional Patent Application No. 62/054,699, filed Sep. 24, 2014, which is hereby incorporated by reference herein in its entirety.

FIELD OF USE

This disclosure relates to storage devices in which a mapping of addresses in stored. More particularly, this disclosure relates to dynamic differential compression of information related to such a mapping.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Data storage devices such as disk drives, including solid-state drives, store data at physical locations, while a host system with which the storage device is associated may refer to the same data with reference to logical locations. In order to be able to store and retrieve the data, the storage device controller maintains a mapping between the physical locations and the logical locations. The mapping data may occupy substantial space. For example, in some systems the mapping data may occupy one megabyte for every gigabyte of user data.

SUMMARY

A method according to implementations of this disclosure for storing data on a storage device includes receiving data to be stored and a received logical address for storing the data to be stored, determining a physical address and storing the data to be stored at the determined physical address, examining a table that associates logical addresses with physical addresses to determine a difference relationship between the determined physical address and a corresponding physical address for one of other logical addresses, and storing in the table, in association with the received logical address, information representing the determined physical address as a function of the determined difference relationship.

A data storage device according to implementations of this disclosure includes controller circuitry and memory for storing a lookup table that associates logical addresses with physical addresses. The controller circuitry receives data to be stored and a received logical address for storing the data to be stored, determines a physical address on a storage medium and sends the data to be stored to the determined physical address on the storage medium for storage, examines the lookup table to determine a difference relationship between the determined physical address and a corresponding physical address for one of other logical addresses, and stores in the lookup table, in association with the received logical address, the determined physical address as a function of the determined difference relationship.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Data may be stored in storage devices in units referred to as allocation units (AUs). Each allocation unit may have a physical location, or physical allocation unit address (PAA), at which it is stored, as well as a logical location, or logical allocation unit address (LAA), at which, for example, a host system considers the data in the allocation unit to located. A user logical block address (LBA) may be mapped into an LAA based on the sector number in an AU. In order to be able to store and retrieve the data, the storage device controller maintains a mapping between the logical locations and the physical locations. The mapping data may occupy substantial space. For example, in some systems the mapping data may occupy one megabyte for every gigabyte of user data.

Figure 1:
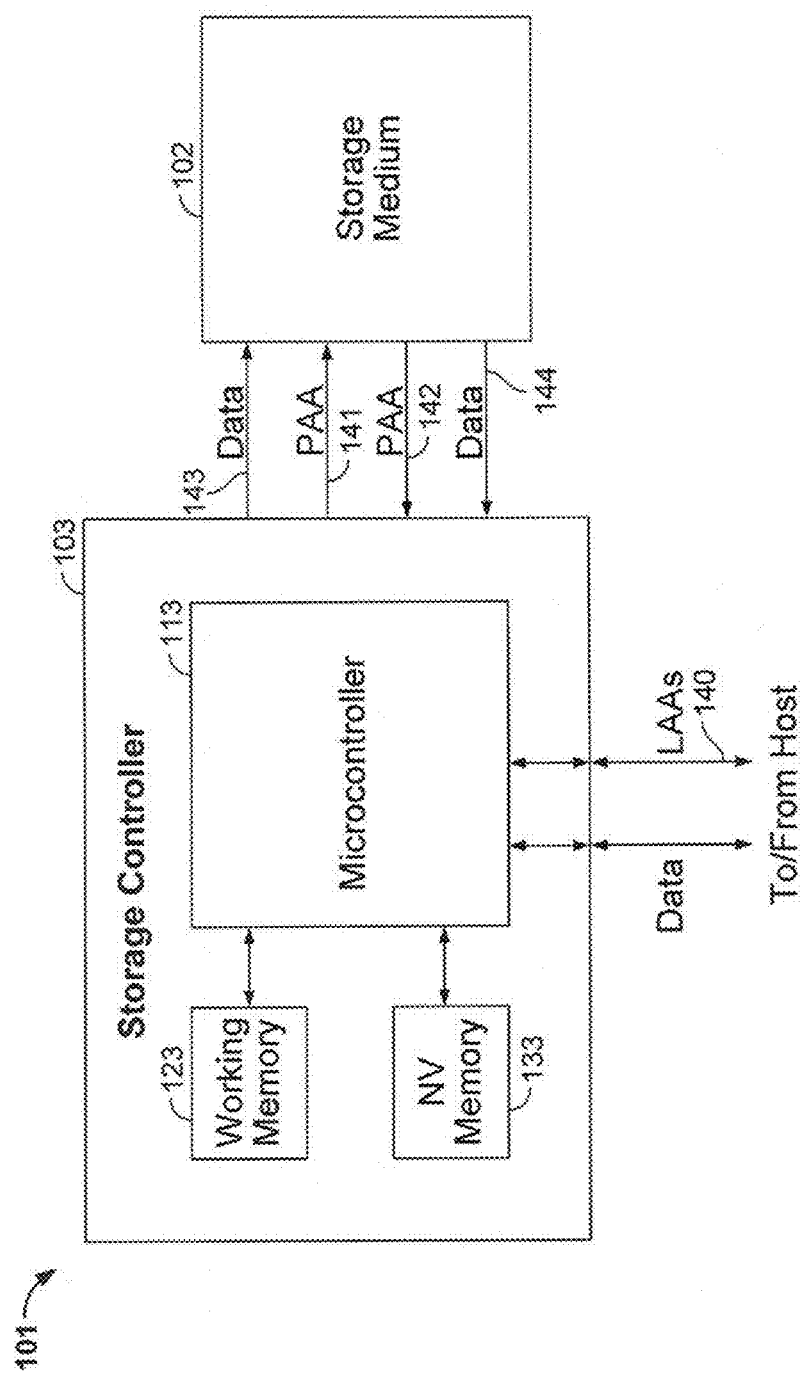
FIG. 1 shows an example of a storage device according to an implementation of this disclosure.

FIG. 1 shows an example of a storage device 101 that can use an implementation of this disclosure. Storage device 101 includes a storage medium 102 and a storage controller 103. Storage medium 102 may be a solid-state medium such as NAND Flash memory, but also may be a magnetic disk drive or a rewritable optical drive, or any other rewritable storage technology.

Storage controller 103 includes a microcontroller 113, working memory 123, and nonvolatile memory 133. The aforementioned mapping data may be stored in nonvolatile memory 133 which could be, e.g., NAND Flash memory. When storage device 101 is powered on, the mapping data may be copied from nonvolatile memory 133 to working memory 123 which could be, e.g., double-data-rate (DDR) dynamic random access memory (DRAM).

A portion of an example of the mapping data may be a look-up table (LUT), as follows:

| | | | | |
|---|---|---|---|---|
| 400B0000 | FFFFFFFF | 00EB8C88 | 00EB8C7F | 00EB8C80 |
| 400B0010 | 00EB8C81 | 00EB8C82 | 00F72EC1 | 00EB89A8 |
| 400B0020 | 00EB89A9 | 00EB89AA | 00F72EC9 | 00F72EA4 |
| 400B0030 | 00F72EA5 | 00F72EA6 | 00F72EA7 | 00F72EA8 |
| 400B0040 | 00F72EA9 | 00F72EAA | 00F72EAB | 00F72EAC |
| 400B0050 | 00F72EAD | 00F72EAE | 00F72EAF | 00F72EB0 |
| 400B0060 | 00F72EB1 | 00F72EB2 | 00F72EB3 | 00F72EB4 |
| 400B0070 | 00F72EB5 | 00F72EB6 | 00F72EB7 | 00F72EB8 |
| 400B0080 | 00F72EB9 | 00F72EBA | 00F72EBB | 00F72EBC |

Each LUT entry is 32 bits or 4 bytes, represented by an eight-character hexadecimal number. Each LUT entry corresponds to an LAA, which represents one AU. The content of a LUT entry is the corresponding PAA of that AU. The PAA encodes a physical address in or on storage medium 102, including channel, device, logical unit number (LUN), sector, block, row address, AU index within a page, etc. Each entry in the far left column is the address in the DRAM where the first of the LUT entries in that row is located, with the remaining LUT entries following in succession.

As noted above, the mapping data in its native form may occupy one megabyte for every gigabyte of user data. Because DDR DRAM is relatively expensive, the mapping data may be compressed in accordance with implementations of this disclosure.

One form of compression is differential compression. If adjacent data values are sufficiently close that the differential or difference relationship between them can be expressed in fewer bits or bytes than expressing the values themselves, then after the first value, each subsequent value can be stored in terms of its differential from the previous value.

Known forms of differential compression provide a fixed number of bytes for expressing the differential between entries. However, in a completely generic case, the differential values of adjacent eight-character entries in the LUT can vary in a large range. If a small number of bytes is reserved for the differential value, that would limit the coverage of the differential compression scheme—i.e., the situations in which differential compression can be used to compress the PAA LUT. Conversely, if a large number of bytes is reserved for the differential value, then the compression is not efficient for data sequences with small differential values.

In accordance with implementations of this disclosure, a dynamic differential compression scheme, in which the number of bytes used to express the differential can change, balances the coverage and efficiency of using differential coding to compress the PAA LUT. According to the dynamic differential compression scheme, a packet header is added at the beginning of the compressed data packet to indicate a packet type and the number of eight-character values in the packet.

In one implementation, seven types of packets (numbered 0-6) may be identified:

| Packet Type | Characteristics |
|---|---|
| 0 | Each PAA in the packet is 0xFFFF_FFFF, representing invalid data |
| 1 | Each PAA in the packet has a differential of 1 with respect to the previous PAA. |
| 2 | Each PAA in the packet has a differential less than or equal to $2^4$ with respect to the previous PAA. The differential value can be represented by 4 bits (half of a byte). |
| 3 | Each PAA in the packet has a differential less than or equal to $2^8$ with respect to the previous PAA. The differential value can be represented by 1 byte. |
| 4 | Each PAA in the packet has a differential less than or equal to $2^{16}$ with respect to the previous PAA. The differential value can be represented by 2 bytes. |
| 5 | Each PAA in the packet has a differential less than or equal to $2^{24}$ with respect to the previous PAA. The differential value can be represented by 3 bytes. |
| 6 | Each PAA in the packet has a large differential ($>2^{24}$) with respect to the previous PAA. |

Figure 2:
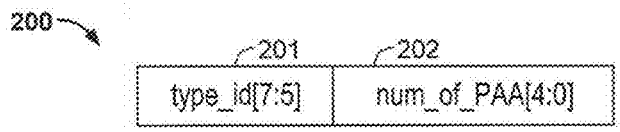
FIG. 2 shows the structure of a packet header according to an implementation of this disclosure.

Therefore, the three most significant bits [7:5] of the packet header are used to represent the packet type. The five least significant bits [4:0] of the packet header are used to indicate the number of PAAs in the packet as a zero-based number where 0 signifies one packet, meaning that a packet can contain up to 32 PAAs. The structure of such a packet header 200 is shown in FIG. 2, where portion 201 includes the three bits representing packet type, and portion 202 includes the five bits representing the number of PAAs in the packet.

Figure 3:
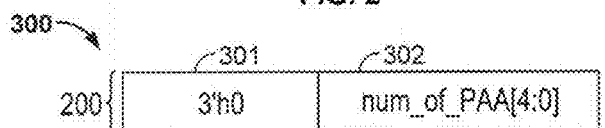
FIG. 3 shows the structure of a first type of data packet according to an implementation of this disclosure.

FIG. 3 shows the structure of a Type 0 packet 300, which includes only a header 200, where portion 302 includes five bits representing the number of PAAs in the packet, and portion 301 includes a three-bit hexadecimal representation of '0', signifying that all of the PAAs represent invalid data. Thus, N consecutive PAAs of invalid data, normally occupying 4N bytes, can be compressed down to just the one-byte header.

Figure 4:
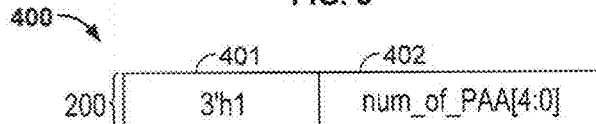
FIG. 4 shows the structure of a second type of data packet according to an implementation of this disclosure.

FIG. 4 shows the structure of a Type 1 packet 400, which again includes only a header 200, where portion 402 includes five bits representing the number of PAAs in the packet, and portion 401 includes a three-bit hexadecimal representation of '1', signifying that each of the PAAs has a unit differential from the previous PAA. (The initial PAA value would be provided in a Type 6 packet 900, described below.) Thus, N consecutive 4-byte PAAs of unit differential, normally occupying 4N bytes, can be compressed down to just the one-byte header.

Figure 5:
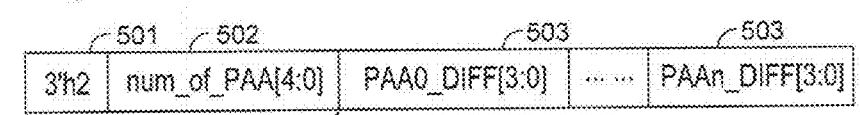
FIG. 5 shows the structure of a third type of data packet according to an implementation of this disclosure.
Figure 5:

FIG. 5 shows the structure of a Type 2 packet 500, which includes a header 200, where portion 502 includes five bits representing the number of PAAs in the packet, and portion 501 includes a three-bit hexadecimal representation of '$2_{10}$' (i.e., '$010_2$') signifying that each PAA has a differential from the previous PAA than can be represented by 4 (or fewer) bits. Packet 500 thus includes the header byte and a number of half-byte (i.e., 4-bit) sequences 503 representing the differential of each PAA from the previous PAA. With each 4-byte PAA replaced by a half-byte differential 503, for a packet representing N 4-byte PAAs, the packet size would be reduced from 4N bytes to (N/2)+1 bytes (the additional byte is the header).

Figure 6:
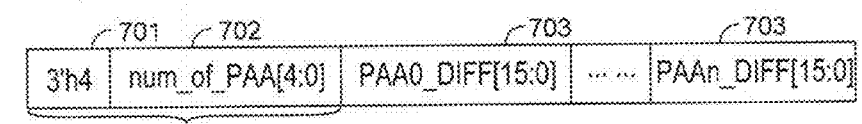
FIG. 6 shows the structure of a fourth type of data packet according to an implementation of this disclosure.

FIG. 6 shows the structure of a Type 3 packet 600, which includes a header 200, where portion 602 includes five bits representing the number of PAAs in the packet, and portion 601 includes a three-bit hexadecimal representation of '$3_{10}$' (i.e., '$011_2$') signifying that each PAA has a differential from the previous PAA than can be represented by one byte. Packet 600 thus includes the header byte and a number of one-byte sequences 603 representing the differential of each PAA from the previous PAA. With each 4-byte PAA replaced by a one-byte differential 603, for a packet representing N 4-byte PAAs, the packet size would be reduced from 4N bytes to N+1 bytes (the additional byte is the header).

Figure 7:
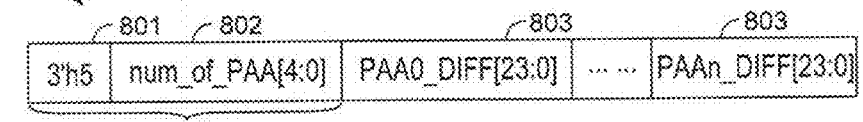
FIG. 7 shows the structure of a fifth type of data packet according to an implementation of this disclosure.

FIG. 7 shows the structure of a Type 4 packet 700, which includes a header 200, where portion 702 includes five bits representing the number of PAAs in the packet, and portion 701 includes a three-bit hexadecimal representation of '$4_{10}$' (i.e., '$100_2$') signifying that each PAA has a differential from the previous PAA than can be represented by 2 bytes. Packet 700 thus includes the header byte and a number of 2-byte sequences 703 representing the differential of each PAA from the previous PAA. With each 4-byte PAA replaced by a 2-byte differential 703, for a packet representing N 4-byte PAAs, the packet size would be reduced from 4N bytes to 2N+1 bytes (the additional byte is the header).

Figure 8:
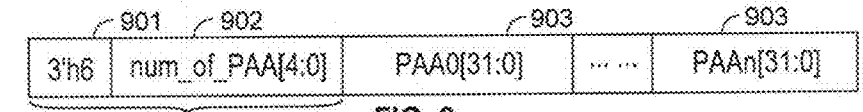
FIG. 8 shows the structure of a sixth type of data packet according to an implementation of this disclosure.

FIG. 8 shows the structure of a Type 5 packet 800, which includes a header 200, where portion 802 includes five bits representing the number of PAAs in the packet, and portion 801 includes a three-bit hexadecimal representation of '$5_{10}$' (i.e., '$101_2$') signifying that each PAA has a differential from the previous PAA than can be represented by 3 bytes. Packet 800 thus includes the header byte and a number of 3-byte sequences 803 representing the differential of each PAA from the previous PAA. With each 4-byte PAA replaced by a 3-byte differential 803, for a packet representing N 4-byte PAAs, the size would be reduced from 4N bytes to 3N+1 bytes (the additional byte is the header).

Figure 9:
FIG. 9 shows the structure of a seventh type of data packet according to an implementation of this disclosure.

FIG. 9 shows the structure of a Type 6 packet 900, which includes a header 200, where portion 902 includes five bits representing the number of PAAs in the packet, and portion 901 includes a three-bit hexadecimal representation of '$6_{10}$' (i.e., '$110_2$') signifying that each PAA has a differential from the previous PAA than cannot be represented by differential coding, because it exceeds a maximum threshold (here, three bytes) that can be represented differentially. Packet 900 thus includes the header byte and all of the 4-byte PAAs 903. For a packet representing N 4-byte PAAs 903, the packet size would actually be increased from 4N bytes to 4N+1 bytes, because of the presence of the header 901/902.

In accordance with implementations of this disclosure, the data in the LUT that maps the LAAs to the PAAs normally will include a mix of packet types. While Type 6 packets are actually larger than the data they replace, the mix of packet types normally would be such that the overall LUT size is reduced.

Unless the first LAA to be mapped represents an invalid address, at least a portion of the mapping data for the first LAA would be stored as a Type 6 packet without compression, and subsequent chunks of mapping data could be compressed in accordance with this disclosure, as discussed below. If the first LAA to be mapped represents an invalid address, then even the initial entry can be compressed into a Type 0 packet.

For example, in the sample LUT above, the first PAA is invalid, the second PAA is 00EB8C88, and the third PAA is 00EB8C79. The first PAA would be represented by a Type 0 packet containing one PAA. Because the difference between the second packet and the first packet is larger than can be represented by three bytes, and because the difference between the third packet and the second packet is negative (−9 hex), the second and third PAAs would be represented by a Type 6 packet in which each PAA is included without compression. The next three PAAs are consecutive with the third PAA, and therefore would be represented by a Type 1 packet indicating three PAAs, and so on.

Each raw chunk of mapping data of a given size would be divided into packets, with the packets compressed as discussed above and then recombined into a compressed chunk of mapping data. FIGS. 10-15 are histograms showing examples of empirical results of compressing sample data based on chunk sizes of 64 bytes, 128 bytes and 256 bytes.

Figure 10:
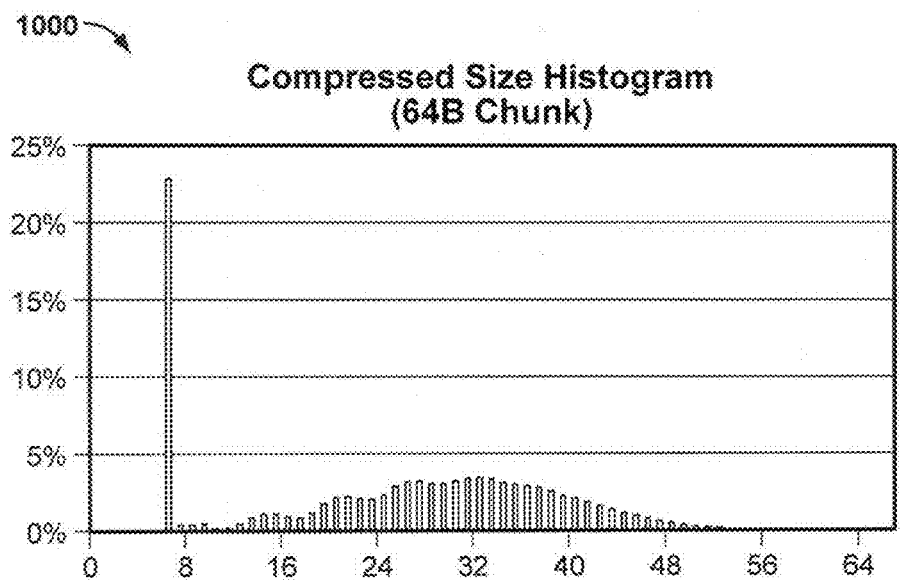
FIG. 10 shows a histogram representing an example of empirical results of compressing sample data based on a chunk size of 64 bytes.
Figure 11:
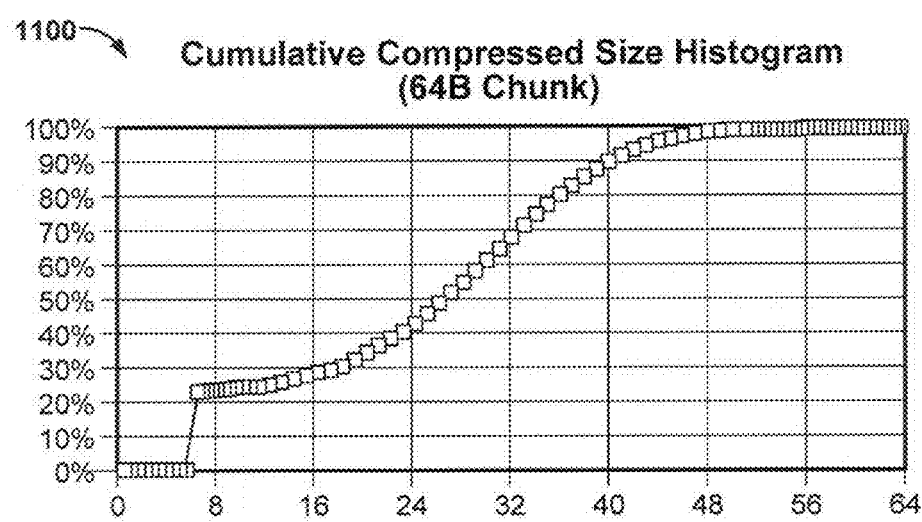
FIG. 11 shows a cumulative histogram representing an example of empirical results of compressing sample data based on a chunk size of 64 bytes.

As shown in histogram 1000 in FIG. 10, for a chunk size of 64 bytes, 23% of chunks could be compressed to a size of 6 bytes, while the remaining 77% of chunks were compressed to between 7 bytes and 53 bytes, with the largest number of those chunks compressed by about 50% to about 32 bytes. As seen in the cumulative histogram 1100 in FIG. 11, and consistent with FIG. 10, 100% of chunks could be compressed to 53 bytes or smaller, for a worst-case compression ratio of about 83%.

Figure 12:
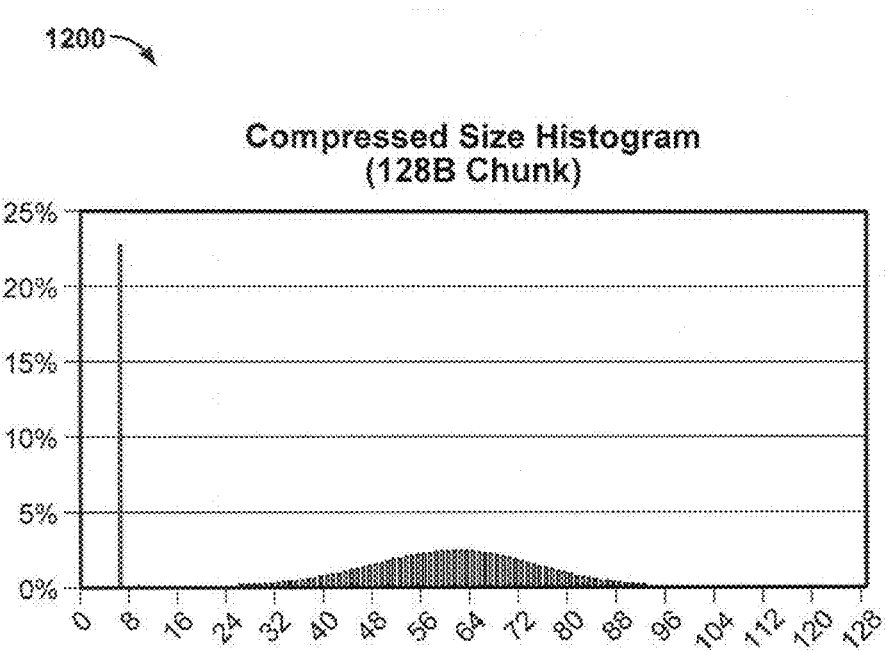
FIG. 12 shows a histogram representing an example of empirical results of compressing sample data based on a chunk size of 128 bytes.
Figure 13:
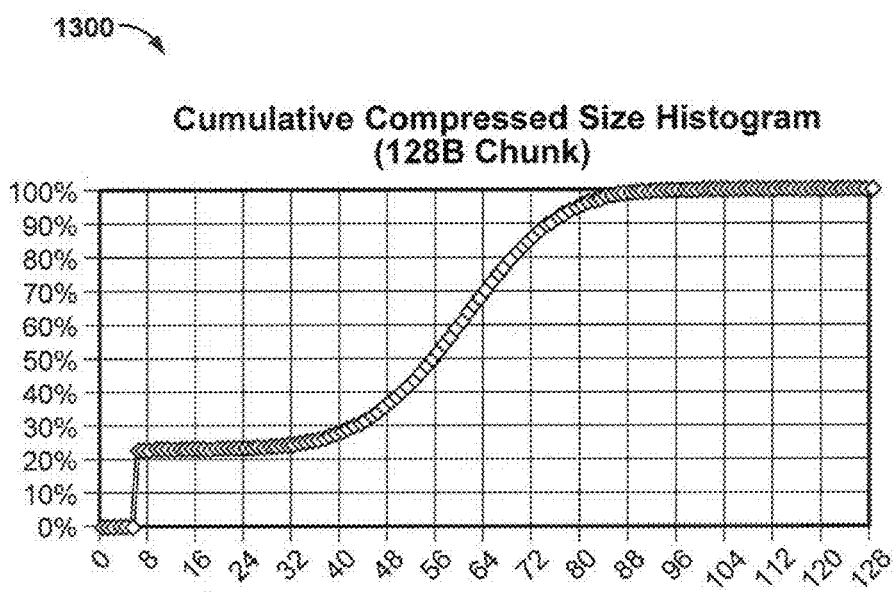
FIG. 13 shows a cumulative histogram representing an example of empirical results of compressing sample data based on a chunk size of 128 bytes.

As shown in histogram 1200 in FIG. 12, for a chunk size of 128 bytes, 23% of chunks could be compressed to a size of 6 bytes, while the remaining 77% of chunks were compressed to between 9 bytes and 93 bytes, with the largest number of those chunks compressed by about 50% to about 64 bytes. As seen in the cumulative histogram 1300 in FIG. 13, and consistent with FIG. 12, 100% of chunks could be compressed to 93 bytes or smaller, for a worst-case compression ratio of about 73%.

Figure 14:
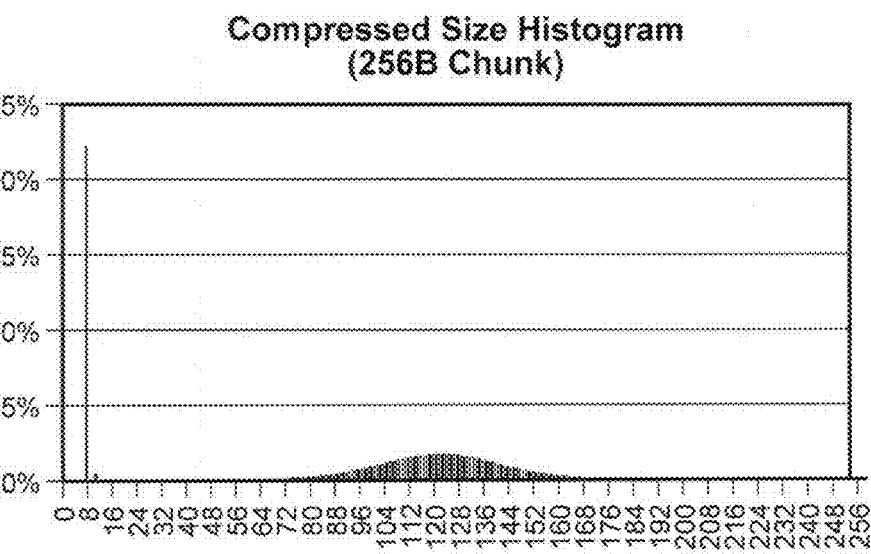
FIG. 14 shows a histogram representing an example of empirical results of compressing sample data based on a chunk size of 256 bytes.
Figure 15:
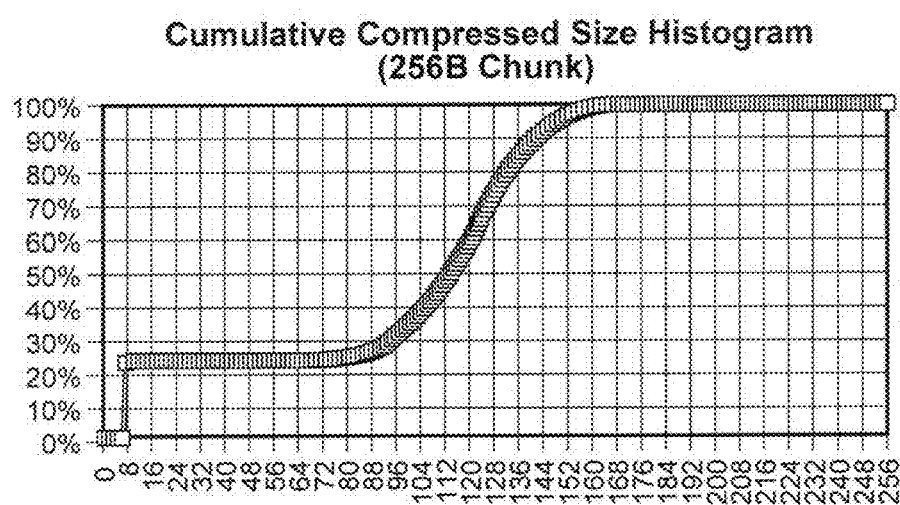
FIG. 15 shows a cumulative histogram representing an example of empirical results of compressing sample data based on a chunk size of 256 bytes.

As shown in histogram 1400 FIG. 14, for a chunk size of 256 bytes, 23% of chunks could be compressed to a size of 7 bytes, while the remaining 77% of chunks were compressed to between 9 bytes and 167 bytes, with the largest number of those chunks compressed by about 50% to about 128 bytes. As seen in the cumulative histogram 1500 in FIG. 15, and consistent with FIG. 14, 100% of chunks could be compressed to 167 bytes or smaller, for a worst-case compression ratio of about 65%.

From these examples, it can be seen that compression ratios improve as chunk size increases. That is to be expected, because larger chunks require less overhead per unit of data. However, as chunk size increases, latency may increase, so in selecting the chunk size, there is a trade-off between latency and compression ratio.

Returning to the discussion of FIG. 1, device controller 103 receives LAAs 140 from a host device (not shown), and sends requests 141 for PAAs 142 to storage medium 102. The LAA-PAA LUT can be stored in nonvolatile memory 133 when device controller 103 is powered down, and in working memory (e.g., DDR DRAM) 123 in which a working copy of the LAA-PAA LUT can be stored when device controller 103 is powered up. The contents of the LAA-PAA LUT are created and modified in working memory 123 by microcontroller 113 as data 143 are written to storage medium 102. When called upon to read data 144 from storage medium 102, microcontroller 113 reads the LAA-PAA LUT from working memory 123. When device controller 103 is powered down, microcontroller 113 writes the current LAA-PAA LUT from working memory 123 to nonvolatile memory 133. When device controller 103 is next powered up, microcontroller 113 reads the LAA-PAA LUT from nonvolatile memory 133 into working memory 123.

When reading data, when microcontroller 113 reads the LAA-PAA LUT to determine the PAA 141 for the data 144 sought by the host, microcontroller 113 reconstructs the desired PAA from the table in working memory 123 by reading the closest previous complete PAA and the intervening difference data.

Figure 16:
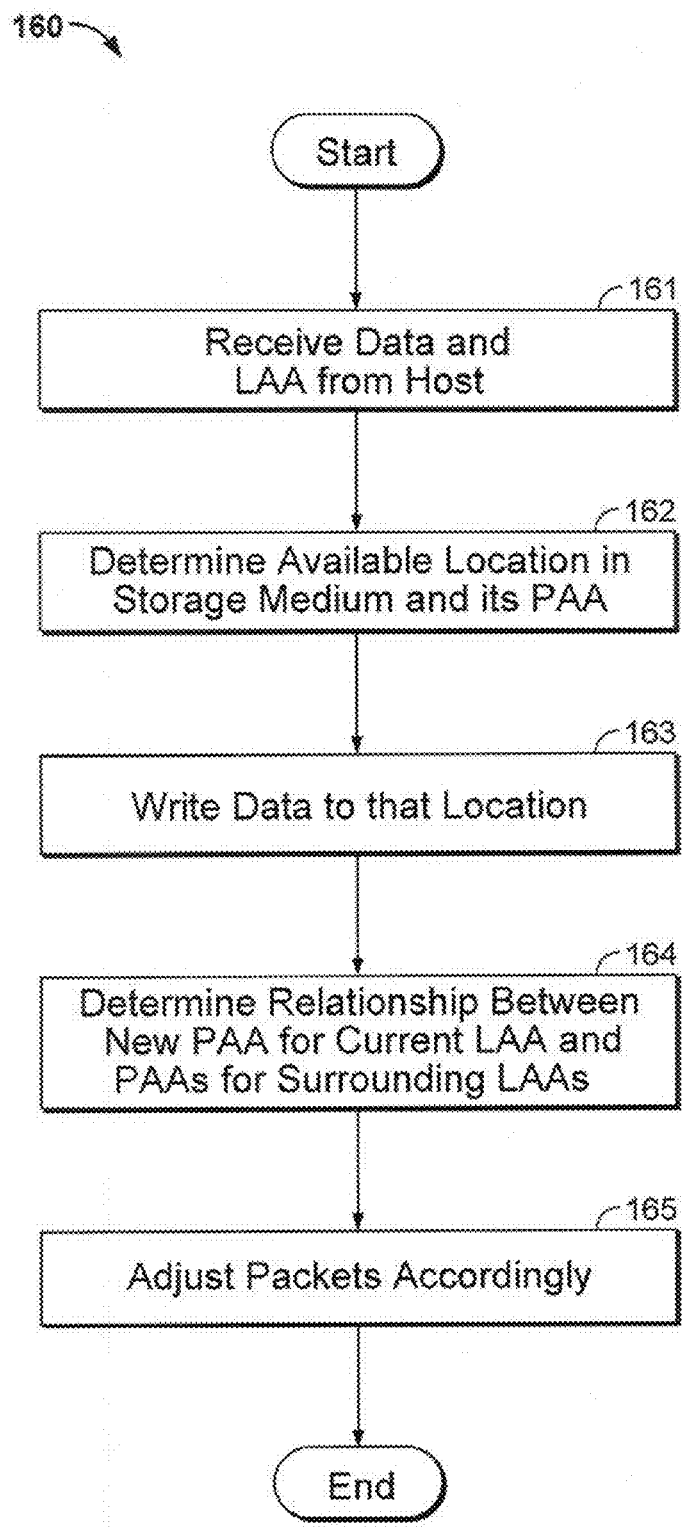
FIG. 16 is a flow diagram of an implementation of a method according to this disclosure to write a logical address/physical address lookup table.

A method 160 that could be used by microcontroller 113 in accordance with this disclosure to write to the LAA-PAA LUT upon receiving data to store from the host is diagrammed in FIG. 16.

At 161, data to be written and an LAA location are received from the host. At 162, an available location on storage medium 162 to which the data can be written, and the PAA of that location, are determined by microcontroller 165. At 163, the data are written to that location.

At 164, the relationship between the newly-determined PAA, which is to be associated with the LAA provided by the host, and the PAAs of surrounding LAAs in the LAA-PAA LUT is determined. That is, the differentials between the new PAA and the neighboring PAAs are determined.

At 165, the LUT is adjusted accordingly; that is, if the differentials are in same packet-type category as the previous PAA for that LAA, then the packet structure in the LUT is not changed, but the individual differentials changed. But if the differentials are such that the packet-type categories have to change, then in addition to updating the differentials, the packet structure of the LUT is re-arranged so that the current PAA and the adjacent PAAs are in packets of the correct type based on the new differentials. Where the new differentials mean that PAAs that were in one packet can no longer be in one packet because at least one is further apart from the others, packets will have to be broken up and new packets created. Where the new differentials mean that PAAs that were in different packets are now close enough to be in one packet, packets may be merged.

After any adjustments at 165, method 160 ends.

Figure 17:
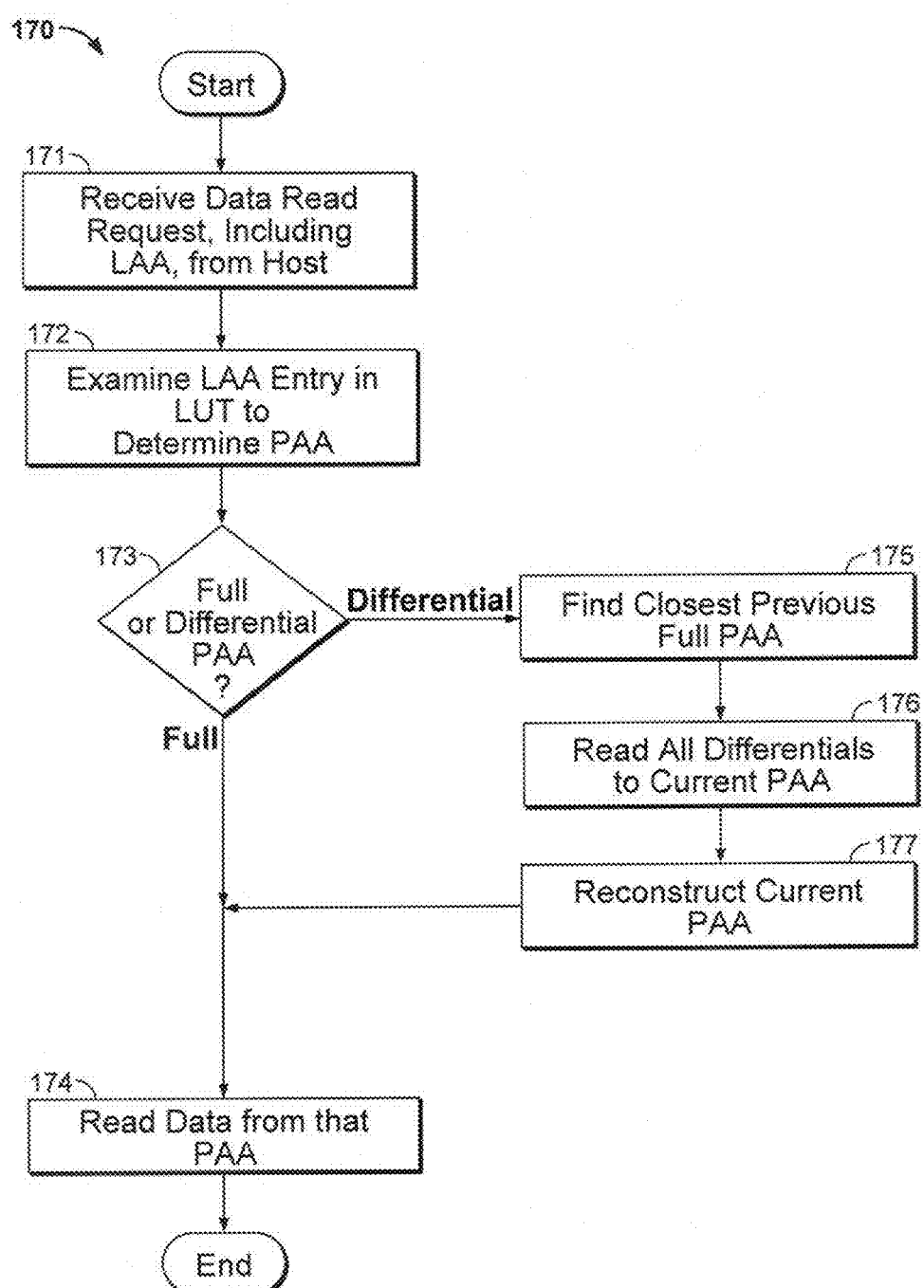
FIG. 17 is a flow diagram of an implementation of a method according to this disclosure for reading data.

A method 170 that could be used by microcontroller 113 in accordance with this disclosure to read the LAA-PAA LUT upon receiving a request from the host to read data is diagrammed in FIG. 17.

At 171, a data read request, including an LAA, is received from the host. At 172, the LAA entry in the LUT is examined to determine the PAA. At 173, it is determined whether the PAA in the LUT is a full PAA, or is indicated by a differential from another PAA. If at 173 it is determined that the PAA is a full PAA, then at 174, data is read from that PAA and method 170 ends.

If at 173 it is determined that the PAA is indicated by a differential from another PAA, then at 175 that other PAA is located. At 176, all differentials between that other PAA and the current PAA are read, and at 177 the differentials are used to reconstruct the current PAA from the other PAA. The requested data are then read at 174 and method 170 ends.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of storing data on a storage device, the method comprising:

receiving respective items of data to be stored and respective received logical addresses for storing the respective items of data to be stored;

determining a respective physical address for each respective item of data and storing the respective item of data to be stored at its respective determined physical address;

examining a table that associates logical addresses with physical addresses to determine a difference relationship between each respective determined physical address and each other respective determined physical address;

storing in the table, in association with each particular respective received logical address, information representing the particular respective determined physical address as a function of number of bits representing the determined difference relationship between the particular respective determined physical address and another respective determined physical address, the storing in the table comprising:

storing the information representing respective determined physical addresses in a plurality of packets, each respective determined physical address other than an initial physical address being represented, in a respective packet of the plurality of packets, as the respective determined difference relationship between the particular respective determined physical address and another respective determined physical address; and storing a respective header in each respective packet, the header specifying how many determined difference relationships are represented by the information stored in the respective packet; wherein:

each respective header further specifies a respective number of bits by which each determined difference relationship is represented in a respective packet; and the respective number of bits by which each determined difference relationship is represented in at least a first respective packet differs from the respective number of bits by which each determined difference relationship is represented in at least one other respective packet.

2. The method of claim 1 further comprising, when magnitude of the respective determined difference relationship between the particular respective determined physical address and the other respective determined physical address exceeds a maximum threshold, storing the determined physical address without change.

3. A data storage device comprising:

controller circuitry; and memory for storing a lookup table that associates logical addresses with physical addresses; wherein the controller circuitry:

receives respective items of data to be stored and respective received logical address for storing the respective items of data to be stored;

determines a respective physical address on a storage medium for each respective item of data to be stored, and sends each respective item of data to be stored to its respective determined physical address on a storage medium for storage;

examines the lookup table to determine a difference relationship between each respective determined physical address and each other respective determined physical address; and stores in the lookup table, in association with each particular respective received logical address, information representing the particular respective determined physical address as a function of number of bits representing the determined difference relationship between the particular respective determined physical address and another respective determined physical address, the storing in the table comprising:

storing the information representing respective determined physical addresses in a plurality of packets, each respective determined physical address other than an initial physical address being represented, in a respective packet of the plurality of packets, as the respective determined difference relationship between the particular respective determined physical address and another respective determined physical address; and storing a respective header in each respective packet, the header specifying how many determined difference relationships are represented by the information stored in the respective packet; wherein:

each respective header further specifies a respective number of bits by which each determined difference relationship is represented in a respective packet; and the respective number of bits by which each determined difference relationship is represented in at least a first respective packet differs from the respective number of bits by which each determined difference relationship is represented in at least one other respective packet.

4. The data storage device of claim 3 wherein, when magnitude of the respective determined difference relationship between the particular respective determined physical address and the other respective determined physical address exceeds a maximum threshold, the controller circuitry stores the determined physical address without change.

5. The data storage device of claim 3 further comprising a data storage medium on which the data are stored.

6. The data storage device of claim 5 wherein the data storage medium comprises a solid-state drive medium.

7. The data storage device of claim 5 wherein the data storage medium comprises a rotating storage medium.

8. The data storage device of claim 7 wherein the rotating storage medium is a magnetic storage medium.

* * * * *